US010047666B2

(12) United States Patent
Yamashita et al.

(10) Patent No.: US 10,047,666 B2
(45) Date of Patent: Aug. 14, 2018

(54) CONTROL SYSTEM FOR TURBO-COMPOUND SYSTEM

(71) Applicant: MITSUBISHI HEAVY INDUSTRIES, LTD., Tokyo (JP)

(72) Inventors: Yukio Yamashita, Tokyo (JP); Ko Takayanagi, Tokyo (JP); Ryo Sase, Tokyo (JP); Atsushi Matsuo, Tokyo (JP); Rikikazu Hayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/024,642

(22) PCT Filed: Nov. 7, 2014

(86) PCT No.: PCT/JP2014/079634
§ 371 (c)(1),
(2) Date: Mar. 24, 2016

(87) PCT Pub. No.: WO2015/083493
PCT Pub. Date: Jun. 11, 2015

(65) Prior Publication Data
US 2016/0265422 A1    Sep. 15, 2016

(30) Foreign Application Priority Data

Dec. 4, 2013  (JP) ................. 2013-251249

(51) Int. Cl.
*F02G 3/00*     (2006.01)
*F02B 33/44*    (2006.01)
(Continued)

(52) U.S. Cl.
CPC ............ *F02B 37/18* (2013.01); *B60W 10/06* (2013.01); *B60W 10/08* (2013.01); *F01N 5/04* (2013.01);
(Continued)

(58) Field of Classification Search
CPC .... F02B 37/18; F02B 37/14; F02B 2037/125; F02B 2039/168; F02D 41/0007;
(Continued)

(56) References Cited

U.S. PATENT DOCUMENTS 4,756,377 A * 7/1988 Kawamura ............. F02B 39/10
60/608
4,774,811 A * 10/1988 Kawamura ............. F02B 39/10
60/608
(Continued)

FOREIGN PATENT DOCUMENTS

| CN | 1360714 A | 7/2002 |
| CN | 101105429 A | 1/2008 |

(Continued)

OTHER PUBLICATIONS

Office Action dated May 31, 2017, issued to the corresponding Chinese Application No. 201480051228.1 with an English Translation.

(Continued)

*Primary Examiner* — Thai Ba Trieu
(74) *Attorney, Agent, or Firm* — Birch, Stewart, Kolasch & Birch, LLP

(57) ABSTRACT

An object is to enable low fuel-consumption operation of an engine by controlling a back pressure and a power generation amount taking account of a trade-off relationship between deterioration of fuel efficiency due to an increase in pumping loss due to a back-pressure rise of the engine and improvement of fuel efficiency due to recovery of exhaust energy by a turbo compound.

7 Claims, 8 Drawing Sheets

(51) Int. Cl.

| | | |
|---|---|---|
| *H02P 9/04* | (2006.01) | |
| *F01D 15/10* | (2006.01) | |
| *F02B 37/18* | (2006.01) | |
| *F01N 5/04* | (2006.01) | |
| *F02B 37/14* | (2006.01) | |
| *H02K 7/18* | (2006.01) | |
| *B60W 10/06* | (2006.01) | |
| *B60W 10/08* | (2006.01) | |
| *F02D 41/14* | (2006.01) | |
| *F02D 41/00* | (2006.01) | |
| *F02B 37/12* | (2006.01) | |
| *F02B 39/16* | (2006.01) | |
| *F02D 41/26* | (2006.01) | |
| *F02D 41/28* | (2006.01) | |

(52) U.S. Cl.
CPC .......... *F02B 37/14* (2013.01); *F02D 41/0007* (2013.01); *F02D 41/1448* (2013.01); *H02K 7/1823* (2013.01); *H02P 9/04* (2013.01); *F02B 2037/125* (2013.01); *F02B 2039/168* (2013.01); *F02D 41/266* (2013.01); *F02D 2041/1409* (2013.01); *F02D 2041/1418* (2013.01); *F02D 2041/281* (2013.01); *F02D 2200/50* (2013.01); *F02D 2200/503* (2013.01); *F02D 2250/34* (2013.01); *Y02T 10/144* (2013.01); *Y02T 10/16* (2013.01); *Y02T 10/163* (2013.01)

(58) Field of Classification Search
CPC .... F02D 41/41; F02D 41/1448; F02D 41/266; F02D 2041/1409; F02D 2041/1418; F02D 2041/281; F02D 2200/40; F02D 2200/503; F02D 2250/34; B60W 10/06; B60W 10/08; F01N 5/04; H02K 7/1823; H02P 9/04; Y02T 10/144; Y02T 10/16; Y02T 10/163
USPC .............. 60/624, 614, 607–608; 290/52
See application file for complete search history.

(56) References Cited

U.S. PATENT DOCUMENTS

| | | | | |
|---|---|---|---|---|
| 4,884,407 | A * | 12/1989 | Hatanaka | F02D 9/06 60/624 |
| 5,645,033 | A | 7/1997 | Person et al. | |
| 6,089,018 | A | 7/2000 | Bischoff et al. | |
| 6,209,390 | B1 | 4/2001 | LaRue et al. | |
| 8,051,661 | B2 * | 11/2011 | Igarashi | F02B 39/10 60/608 |
| 8,584,460 | B2 * | 11/2013 | Mardberg Jozsa | B60W 10/06 60/624 |
| 8,813,494 | B2 * | 8/2014 | Hofer | F02B 37/013 60/624 |
| 2003/0145591 | A1 | 8/2003 | Arnold | |
| 2004/0139809 | A1 | 7/2004 | Soechting et al. | |
| 2004/0187495 | A1 | 9/2004 | Ando et al. | |
| 2005/0193810 | A1 | 9/2005 | Gladden | |
| 2006/0021344 | A1 | 2/2006 | Barba et al. | |
| 2006/0026960 | A1 | 2/2006 | Butscher et al. | |
| 2006/0113799 | A1 | 6/2006 | Obayashi et al. | |
| 2006/0162333 | A1 * | 7/2006 | Isogai | F02D 41/0007 60/600 |
| 2006/0287795 | A1 | 12/2006 | Samad et al. | |
| 2008/0047268 | A1 * | 2/2008 | Isogai | F02B 39/10 60/608 |
| 2009/0107140 | A1 | 4/2009 | Pursifull | |
| 2009/0222190 | A1 | 9/2009 | Andreae et al. | |
| 2009/0287448 | A1 | 11/2009 | Brown et al. | |
| 2009/0299609 | A1 * | 12/2009 | Gokhale | F02D 35/023 701/105 |
| 2011/0192161 | A1 | 8/2011 | Takahaski et al. | |
| 2011/0288744 | A1 * | 11/2011 | Gokhale | F02D 35/02 701/102 |
| 2013/0167810 | A1 | 7/2013 | Roplekar et al. | |
| 2013/0227944 | A1 * | 9/2013 | Denholm | F02B 39/10 60/605.1 |
| 2015/0037178 | A1 * | 2/2015 | Wang | F02B 39/08 417/380 |
| 2015/0122234 | A1 | 5/2015 | Tanaka | |
| 2015/0285122 | A1 | 10/2015 | Yamashita et al. | |
| 2017/0002726 | A1 * | 1/2017 | Iwamoto | F02B 39/10 |

FOREIGN PATENT DOCUMENTS

| | | |
|---|---|---|
| CN | 101424211 A | 5/2009 |
| CN | 101273385 B | 5/2010 |
| CN | 102177323 A | 9/2011 |
| CN | 102418610 A | 4/2012 |
| EP | 2 317 082 A2 | 5/2011 |
| EP | 2434123 A1 | 3/2012 |
| JP | 58-53643 A | 3/1983 |
| JP | 59-52139 U | 4/1984 |
| JP | 61-38127 U | 3/1986 |
| JP | 62-210222 A | 9/1987 |
| JP | 64-32019 A | 2/1989 |
| JP | 5-33668 A | 2/1993 |
| JP | 5-280365 A | 10/1993 |
| JP | 6-323158 A | 11/1994 |
| JP | 6-341325 A | 12/1994 |
| JP | 7-150990 A | 6/1995 |
| JP | 8-326555 A | 12/1996 |
| JP | 9-329032 A | 12/1997 |
| JP | 10-159576 A | 6/1998 |
| JP | 2000179348 A * | 6/2000 |
| JP | 2000-356158 A | 12/2000 |
| JP | 2001-342840 A | 12/2001 |
| JP | 2002-188474 A | 7/2002 |
| JP | 2002-544443 A | 12/2002 |
| JP | 2003-227362 A | 8/2003 |
| JP | 2003-269183 A | 9/2003 |
| JP | 2004-27897 A | 1/2004 |
| JP | 2004-251203 A | 9/2004 |
| JP | 2005-83317 A | 3/2005 |
| JP | 2005-155384 A | 6/2005 |
| JP | 2005-248952 A | 9/2005 |
| JP | 2005-351129 A | 12/2005 |
| JP | 2006-63873 A | 3/2006 |
| JP | 2006-188989 A | 7/2006 |
| JP | 2006-207506 A | 8/2006 |
| JP | 2006-242462 A | 9/2006 |
| JP | 2006-242487 A | 9/2006 |
| JP | 2007-32860 A | 2/2007 |
| JP | 2007-206007 A | 8/2007 |
| JP | 2008-45410 A | 2/2008 |
| JP | 2008-175126 A | 7/2008 |
| JP | 2008-544144 A | 12/2008 |
| JP | 4209350 B2 | 1/2009 |
| JP | 2010-14122 A | 1/2010 |
| JP | 4415912 B2 | 2/2010 |
| JP | 2010-180710 A | 8/2010 |
| JP | 2010-190145 A | 9/2010 |
| JP | 2011-247181 A | 12/2011 |
| JP | 2011-256743 A | 12/2011 |
| JP | 2012-7544 A | 1/2012 |
| JP | 2012-52508 A | 3/2012 |
| JP | 2013-19319 A | 1/2013 |
| JP | 2013-127221 A | 6/2013 |
| JP | 2013-133776 A | 7/2013 |
| JP | 2013-185441 A | 9/2013 |
| JP | 2013-217382 A | 10/2013 |
| JP | 2014-84772 A | 5/2014 |
| WO | WO 00/70562 A1 | 11/2000 |
| WO | WO 03/071111 A2 | 8/2003 |
| WO | WO 2006/138545 A1 | 12/2006 |
| WO | WO 2007/055094 A1 | 5/2007 |
| WO | WO 2007/141613 A1 | 12/2007 |
| WO | WO 2013/004595 A1 | 1/2013 |

(56) References Cited

FOREIGN PATENT DOCUMENTS

WO    WO 2013/066529 A1    5/2013
WO    WO 2013/157126 A1    10/2013

OTHER PUBLICATIONS

International Search Report and Written Opinion of the International Searching Authority (Forms PCT/ISA/210, PCT/ISA/220 and PCT/ISA/237), dated Feb. 3, 2015, for International Application No. PCT/JP2014/079634.
International Search Report and Written Opinion of the International Searching Authority (Forms PCT/ISA/210, PCT/ISA/220 and PCT/ISA/237), dated Jan. 27, 2015, for International Application No. PCT/JP2014/081384.
International Search Report and Written Opinion of the International Searching Authority (Forms PCT/ISA/210, PCT/ISA/220 and PCT/ISA/237), dated Mar. 3, 2015, for International Application No. PCT/JP2014/081381.
International Search Report and Written Opinion of the International Searching Authority (Forms PCT/ISA/210, PCT/ISA/220 and PCT/ISA/237), dated Mar. 3, 2015, for International Application No. PCT/JP2014/081387.
International Search Report and Written Opinion of the International Searching Authority (Forms PCT/ISA/210, PCT/ISA/220 and PCT/ISA/237), dated Mar. 3, 2015, for International Application No. PCT/JP2014/081723.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/079634, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081381, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081384, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081387, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081723, together with an English translation thereof.
Extended European Search Report, dated Jul. 1, 2016, for European Application No. 14868701.5.
Extended European Search Report dated Nov. 4, 2016 in corresponding EP Application No. 14858295.8
Extended European Search Report dated Jan. 10, 2017 issued in corresponding EP Application No. 14867944.2.
Partial Supplementary European Search Report, dated Feb. 28, 2017, for European Application No. 14868535.7.
Partial Supplementary European Search Report, dated Mar. 2, 2017, for European Application No. 14867002.9.
Extended European Search Report dated Jun. 8, 2017, issued to the corresponding EP Application No. 14867002.9.
Extended European Search Report dated Jun. 8, 2017, issued to the corresponding EP Application No. 14868535.7.
Chinese Office Action and Search Report for Chinese Application No. 201480065709.8, dated Nov. 3, 2017, with English translation of the Office Action.
Chinese Office Action and Search Report, dated Aug. 3, 2017, for Chinese Application No. 201480051852.1, with an English translation of the Office Action.
Chinese Office Action and Search Report, dated Aug. 7, 2017, for Chinese Application No. 201480050503.8, with an English translation of the Office Action.
Chinese Office Action and Search Report for Chinese Application No. 201480060612.8, dated Sep. 5, 2017, with an English translation of the Office Action.
Japanese Notification of Reasons for Refusal for Japanese Application No. 2013-251248, dated Sep. 1, 2017, with an English translation.

* cited by examiner

--Prior Art--

CONTROL SYSTEM FOR TURBO-COMPOUND SYSTEM

TECHNICAL FIELD

The present invention relates to a control system for a turbo-compound system of an engine, especially to a control system for a turbo-compound system including a generator (electrical turbo compound) rotated by utilizing exhaust energy.

BACKGROUND ART

A turbo compound is a system for increasing an axle driving force. A known turbo compound rotates a turbine with exhaust gas of an engine to transmit the output of the turbine to a crank shaft via a gear or a coupling, or rotates a generator with exhaust gas to extract and utilize electric energy.

For instance, Patent Document 1 (JP2008-175126A) discloses an electric turbo compound which, in a schematic configuration based on FIG. 9, includes an energy recovery part 010 which recovers energy by sucking in a part or all of exhaust gas discharged from a turbine 01a of a turbocharger 01 including the turbine 01a and a compressor 01b, a valve 07 capable of changing the ratio of exhaust gas to be sucked into the energy recovery part 010, and a valve controller 08 for controlling the valve 07 to be open or closed in accordance with a predetermined control pattern.

Further, Patent Document 2 (JP2010-190145A) discloses a configuration including an electric compressor 3 driven by an electric motor 3m to rotate to compress air, thereby supplying the compressed air to an internal combustion engine 7, a turbine generator 2 for generating power by driving a generator 2g with a turbine 2t driven by exhaust gas from the internal combustion engine 7, and a storage unit 12 for storing electric power generated by the turbine generator 2 and supplying the electric power to the electric compressor 3 (see FIG. 2).

Further, Patent Document 3 (JPH6-323158A) discloses recovering energy by driving a turbocharger with exhaust energy of exhaust gas supplied to the turbocharger through the first exhaust port in the first half of an exhaust process, in which combustion gas has a sufficient flow rate, and increasing an engine output by recovering energy of exhaust gas corresponding to a decrease in a back pressure at a turbine inlet of an energy recovery device to which exhaust gas is supplied through the second port bypassing the turbocharger in the second half of the exhaust process, in which the flow rate of the combustion gas is low.

CITATION LIST

Patent Literature

Patent Document 1: JP2008-175126A
Patent Document 2: JP2010-190145A
Patent Document 3: JPH6-323158A

SUMMARY

Problems to be Solved

For an electric turbo compound (a turbine generator or a power regeneration mode of an electric assist turbo with a motor generator sharing a shaft with a turbine and a compressor of a turbocharger), a turbine needs to be rotated by a torque greater than a compressor load torque or a motor regeneration torque, and thus exhaust gas of an engine needs to have a relatively high pressure. Thus, a back pressure of the engine is high if exhaust energy is to be recovered by an electric turbo compound, which may increase pumping loss and deteriorate fuel efficiency.

Accordingly, while exhaust energy is recovered by a turbo compound, the recovery is canceled by deterioration of fuel efficiency accompanying pumping loss due to an increase in a back pressure, thus resulting in a decrease of an advantageous effect achieved by the turbo compound.

Patent Documents 1 and 2 disclose recovering exhaust energy by converting exhaust energy into electric energy as described above, but do not disclose an output control for a generator taking account of the trade-off (paradoxical) relationship between the recovery effect and the increase in pumping loss of the engine accompanying an increase in a back pressure.

Further, as described above, Patent Document 3 discloses using different ports for discharging exhaust gas in the first half and the second half of an exhaust process to recover exhaust energy to increase an engine output even if a back pressure of a turbine inlet decreases. However, two exhaust ports need to be formed and thus the apparatus size may increase, and there is no disclosure of an output control for a generator taking account of the trade-off (paradoxical) relationship between the amount of energy recovered by the turbine generator and the increase in pumping loss of the engine.

The present invention was made in view of this, and an object of the present invention is to enable low fuel-consumption operation of an engine by controlling a back pressure and an output of a generator taking account of the trade-off (paradoxical) relationship between improvement of fuel efficiency due to recovery of exhaust energy by the turbo compound and deterioration of fuel efficiency due to an increase in pumping loss of the engine caused by an increase in a back pressure.

Solution to the Problems

The present invention was made in view of this, and a control system for a turbo-compound system according to the present invention comprises: a turbocharger for supercharging intake air to an engine; a turbine generator configured to be rotated by exhaust gas from the engine; a power-generation-amount control unit configured to control a power generation amount of the turbine generator; a back-pressure control unit configured to control a back pressure of the exhaust gas discharged from the engine by bypassing or restricting exhaust gas to be introduced into an exhaust turbine; and a turbo controller comprising a power-generation-mode setting unit configured to set the power generation amount of the turbine generator to a low fuel-consumption mode, the turbo controller being configured to, in the low fuel-consumption mode, control the power-generation-amount control unit and the back-pressure control unit so that the engine continues low fuel-consumption operation, on the basis of a relationship between an increase in a pumping loss due to a back-pressure rise for rotating the turbine generator and a recovery amount of exhaust energy by the turbine generator.

According to the above invention, in the low fuel-consumption mode, the turbo controller controls the power-generation-amount control unit and the back-pressure control unit, so that the engine continues low fuel-consumption operation, i.e., so that at least a recovery amount of exhaust energy recovered by the turbine generator is greater than an increase in the fuel consumption due to an increase in pumping loss, on the basis of a relationship between an increase in pumping loss due to a back-pressure rise caused in response to rotation of the turbine generator and a recovery amount of exhaust energy obtained by the turbine generator. As a result, low fuel-consumption operation of the engine is enabled.

Further, preferably in the present invention, the power-generation-mode setting unit is configured to set: a maximum regeneration mode to cause the turbine generator to perform regeneration operation at a maximum capacity without limiting power generation of the turbine generator; a no-regeneration mode to stop power generation of the turbine generator; or the low fuel-consumption mode to be set if neither the maximum regeneration mode nor the no-regeneration mode is set.

With the above configuration, a power generation control is performed on the turbine generator in accordance with a set operation mode. Thus, it is possible to control to achieve a power generation amount corresponding to a charging state of a battery for storing electric power from the turbine generator, an electric-load state inside a vehicle, or a power generation state of an alternator driven by a crank shaft of the engine.

Further, preferably in the present invention, the turbo controller may include a control computation part and a sensor signal input part provided separately and independently from an engine controller for controlling operation of the engine.

As described above, the turbo controller (turbo ECU) includes a control computation part and a sensor-signal input part separately and independently provided from an engine controller (engine ECU) for controlling operation of the engine. In a case where communication with the engine controller is involved, for instance, in a case where sensor signals are transmitted through a controller area network (CAN) to the turbo controller via the engine controller, or in a case where the computation result of the engine controller is utilized in computation of the turbo controller, a delay may be caused in control computation of the turbo controller, depending on a data-transmission cycle of the engine controller. However, with the control computation part and the sensor-signal input part provided independently, it is possible to cancel such a delay and to perform fuel-reduced control following a change in the load of the engine.

Further, with the turbo controller including the sensor signal input part provided separately and independently from the engine controller, it is possible to input detection signals accurately (timely) representing a rotation speed of the turbine and an output pressure of the compressor independently. Thus, it is possible to determine a surge margin with respect to occurrence of surging of the compressor and a rotation-speed margin with respect to over rotation. In this way, it is possible to prevent over rotation and surging better than in a case in which signals are obtained through communication with the engine controller.

Further, preferably in the present invention, the turbo controller has a back-pressure/power-generation-amount map in which a relationship between the back pressure and the power generation amount of the turbine generator is set in advance, the power generation amount being such that low fuel-consumption is sustainable with respect to the back pressure, and is configured to control the power-generation-amount control unit and the back-pressure control unit on the basis of the back-pressure/power-generation-amount map.

As described above, the power-generation-amount control unit and the back-pressure control unit are controlled using the back-pressure/power-generation-amount map, in which a relationship between the back pressure and the power generation amount is set in advance, the power generation amount being such that the low-fuel consumption can be maintained. Thus, it is possible to control the power generation amount of the turbine generator to overcome deterioration of fuel efficiency due to pumping loss of the engine.

Further, preferably in the present invention, the turbocharger comprises an exhaust turbocharger, a power generation turbine of the turbine generator is disposed on a downstream side of the exhaust turbocharger with respect to a flow of the exhaust gas, the back-pressure control unit comprises a first bypass control valve for bypassing exhaust gas which is to flow to an exhaust turbine of the exhaust turbocharger, and the power-generation-amount control unit comprises a converter connected to the turbine generator.

As described above, with the turbocharger compound system comprising a power generation turbine of the turbine generator disposed on a downstream side of the exhaust turbine of the exhaust turbocharger with respect to a flow of the exhaust gas, the back-pressure control unit comprising the first bypass control valve for bypassing exhaust gas which is to flow to the exhaust turbine of the exhaust turbocharger, and the power-generation-amount control unit comprising a converter connected to the turbine generator, it is possible to control the back pressure and the power generation amount with a simplified structure.

Further, preferably in the present invention, the turbocharger comprises an exhaust turbocharger, a power generation turbine of the turbine generator is disposed on a downstream side of the exhaust turbocharger with respect to a flow of the exhaust gas, the back-pressure control unit comprises a variable nozzle mechanism for restricting a flow of exhaust gas which is to flow into turbine blades of the exhaust turbine, and the power-generation-amount control unit comprises a converter connected to the turbine generator.

As described above, with the turbocharger compound system comprising a power generation turbine of the turbine generator disposed on a downstream side of the exhaust turbine of the exhaust turbocharger with respect to a flow of the exhaust gas, and the back-pressure control unit comprising a variable nozzle mechanism for restricting a flow of exhaust gas which is to flow into turbine blades of the exhaust turbine of the exhaust turbocharger, and the power-generation-amount control unit comprising a converter connected to the turbine generator to control the power generation amount, it is possible to control the back pressure and the power generation amount with a simplified structure.

Further, preferably in the present invention, an electric compressor may be disposed on an upstream side or a downstream side, with respect to a flow of air supply, of a compressor of the exhaust turbocharger.

As described above, with the electric compressor provided, it is possible to control only a boost pressure without affecting fluctuation of a back pressure, which facilitates control of a boost pressure and a back pressure, while enabling an accurate control.

Further, preferably in the present invention, the turbocharger comprises an electric compressor, the back-pressure control unit comprises a second bypass control valve for bypassing exhaust gas which is to flow to a power generation turbine of the turbine generator rotated by exhaust gas from the engine, and the power-generation-amount control unit comprises a converter connected to the turbine generator.

In the turbo-compound system with the electric compressor and the turbine generator respectively disposed in the intake channel and the exhaust channel, the back-pressure control unit comprises the second bypass control valve for exhaust gas to bypass the power generation turbine of the turbine generator, and the power-generation-amount control unit comprises the converter connected to the generator of the turbine generator. Thus, it is possible to control the back pressure and the power generation amount with a simplified structure.

Advantageous Effects

According to the present invention, it is possible to enable low fuel-consumption operation of the engine by controlling the back pressure and the output of the generator taking account of the trade-off (paradoxical) relationship between improvement of fuel efficiency by recovery of exhaust energy by the turbo compound and deterioration of fuel efficiency due to an increase in pumping loss of the engine accompanying an increase in a back pressure.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
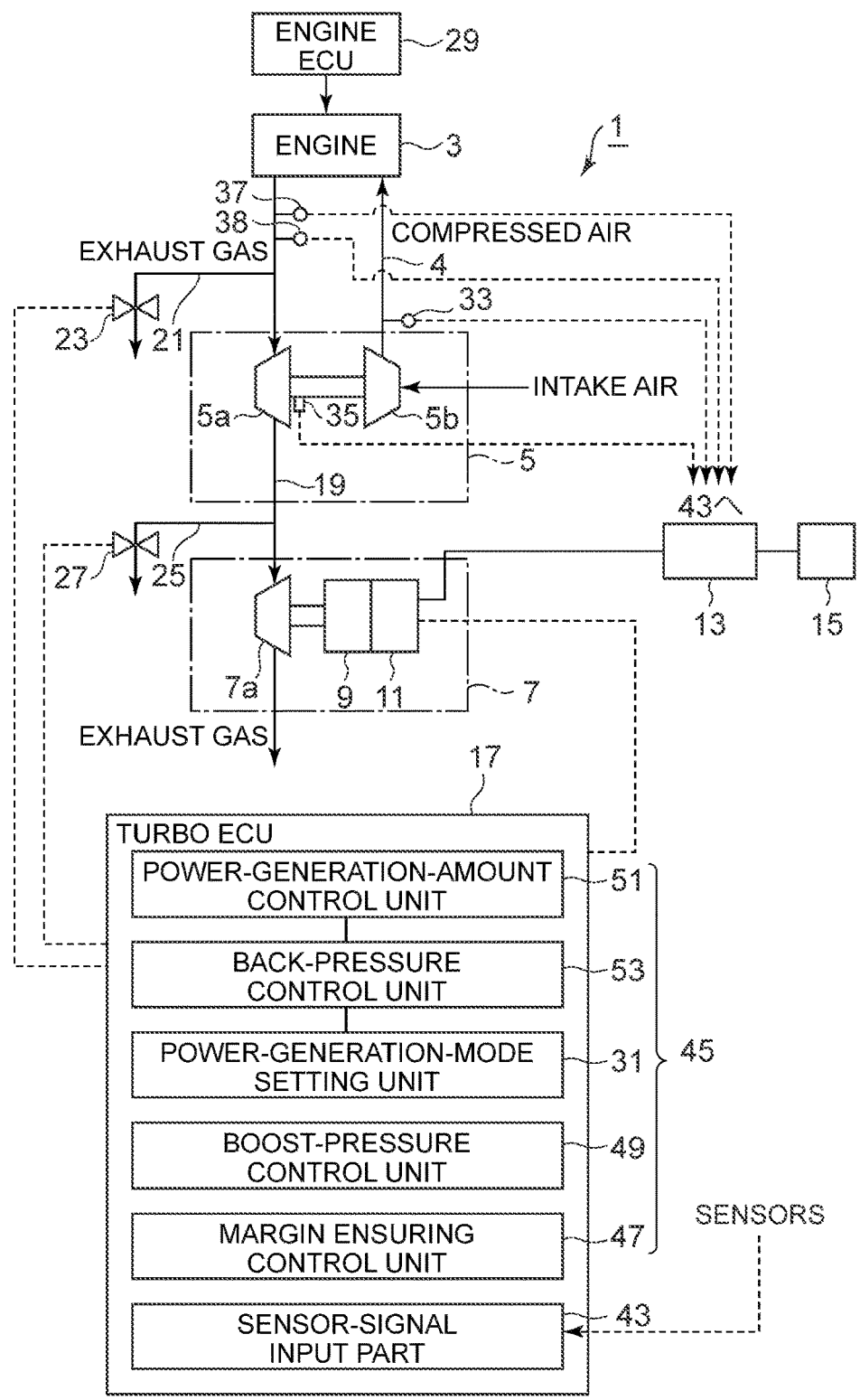
FIG. 1 is an overall configuration diagram illustrating the first embodiment of a control system for a turbo-compound system according to the present invention.

FIG. 1 illustrates a control system for a turbo-compound system according to the first embodiment of the present invention, and the turbo-compound system 1 includes an exhaust turbocharger 5 driven by exhaust energy, the exhaust turbocharger 5 being a turbocharger driven by exhaust energy of an engine 3, and a turbine generator (electric turbo compound) 7 disposed on the downstream side of the flow of the exhaust gas and rotated utilizing exhaust energy.

The exhaust turbocharger 5 includes an exhaust turbine 5a driven by exhaust gas from the engine 3, and a compressor 5b driven to rotate by a rotational force of the exhaust turbine 5a to compress intake air and supply the compressed air to the engine 3 via an intake channel 4.

Further, the turbine generator 7 includes a power generation turbine 7a driven by exhaust gas and a generator 9 connected to the power generation turbine 7a. A converter 11 is connected to the generator 9. An AC generator is used as the generator 9, and AC is converted into DC by the converter 11 to be stored in a battery 13, a storage unit. The battery 13 also serves as a power source for driving an auxiliary machine 15 inside a vehicle, for instance. While the generator is described as being an AC generator, the generator may be a DC generator, as long as the power generation amount can be controlled by a turbo controller (turbo ECU) 17 described below.

An exhaust channel 19 extends from the engine 3 to be connected to the exhaust turbine 5a of the exhaust turbocharger 5, and branches midway to form the first bypass channel 21 which allows the exhaust gas to bypass the exhaust turbine 5a and the power generation turbine 7a to be discharged to a downstream exhaust channel, the first bypass channel 21 including the first waste gate valve 23.

Further, the exhaust channel 19 connecting the exhaust turbine 5a and the power generation turbine 7a branches midway to form the second bypass channel 25. The second bypass channel 25 includes the second waste gate valve 27 and bypasses the power generation turbine 7a to communicate with a downstream exhaust channel.

The engine 3 is a diesel engine or a gasoline engine used for automobiles, ships, fixed engines, or the like. For the engine 3, a supply amount of compressed air or fuel is controlled in accordance with an operation state, and a control is performed by an engine controller (engine ECU) 29. The engine ECU 29 is a controller provided separately from the turbo ECU 17.

Figure 2:
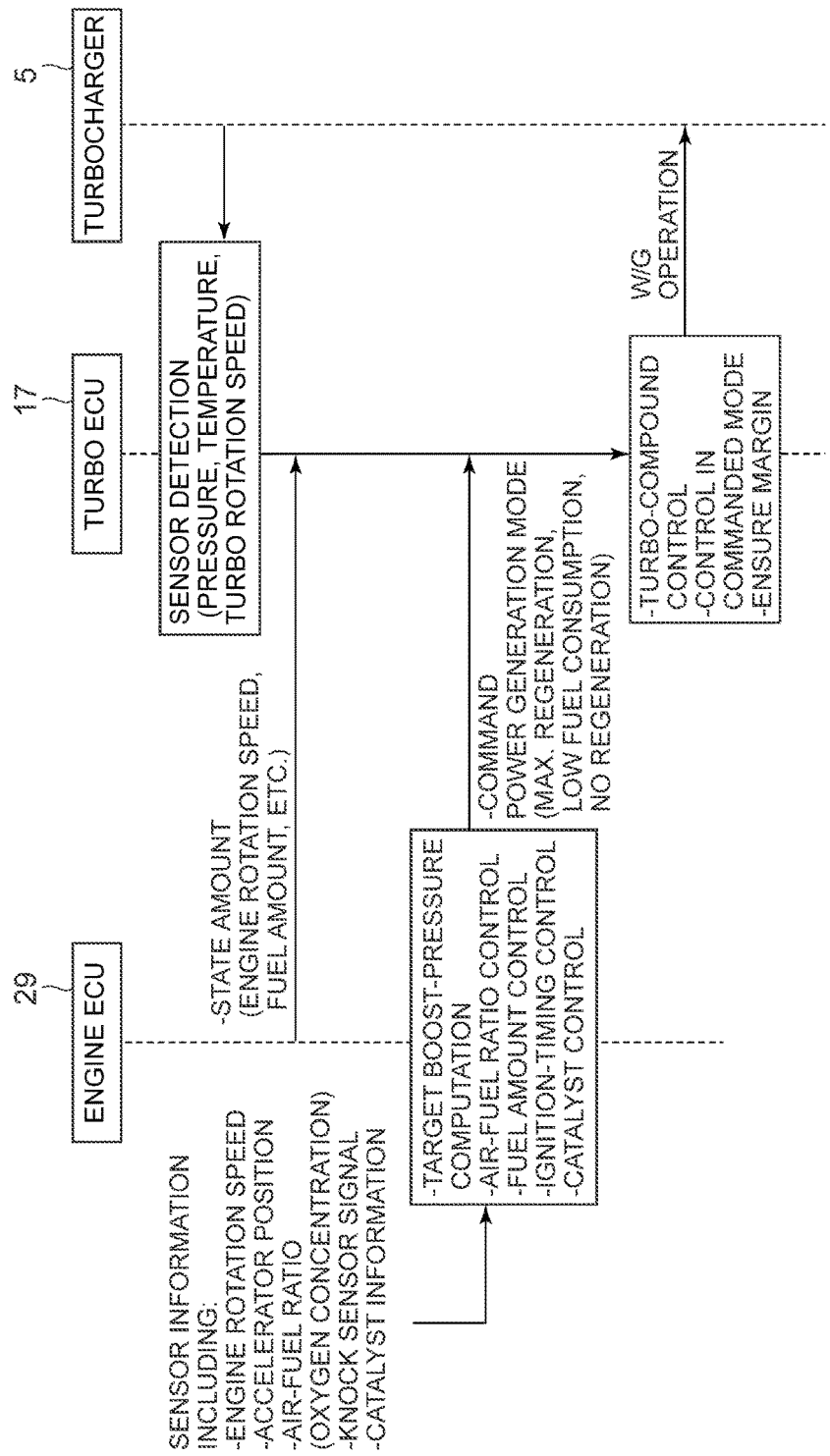
FIG. 2 is an explanatory diagram of signal transmission between an engine ECU and a turbo ECU.

FIG. 2 schematically illustrates signal transmission between the engine ECU 29 and the turbo ECU 17.

As illustrated in FIG. 2, various signals are inputted to the engine ECU 29, the signals including an engine rotation-speed signal, an accelerator-position signal, an air-fuel rate (oxygen concentration) signal, a knock-sensor signal, and sensor signals related to medium information, such as a medium temperature, and to an exhaust temperature, for instance.

On the basis of the input signals, controls including target boost-pressure computation, air-fuel rate control, fuel injection amount control, ignition-timing control, medium control, are performed.

Further, information on a state amount, such as an engine rotation speed and a fuel amount, is transmitted from the engine ECU 29 to the turbo ECU 17 through a communication line at a predetermined communication cycle.

Further, the engine ECU 29 determines a power generation mode of the turbine generator 7, and the determination result, which is a command of the power generation mode, is transmitted to the turbo ECU 17 at a predetermined communication cycle.

The turbo ECU 17 receives the command of the power generation mode with a power generation mode setting unit 31 of the turbo ECU 17, and controls an output of the turbine generator 7 so as to achieve a power generation output corresponding to the power generation mode set by the power generation mode setting unit 31.

Further, various signals from the exhaust turbocharger 5 are read in by the turbo ECU 17, the signals including sensor signals from a pressure sensor 33 for detecting a discharge pressure of the compressor 5b, a rotation-speed sensor 35 for detecting a rotation speed of the exhaust turbine 5a, a back-pressure sensor 37 for detecting a back pressure of the exhaust turbine, and an exhaust-temperature sensor 38 for detecting an exhaust temperature, thereby performing operation in accordance with a target boost pressure or operation with a margin secured so as not to bring about surging, over rotation of the compressor 5b of the exhaust turbocharger 5, and over heating of the exhaust temperature. The opening degree of the first waste gate valve 23 is controlled for the above controls.

Figure 3:
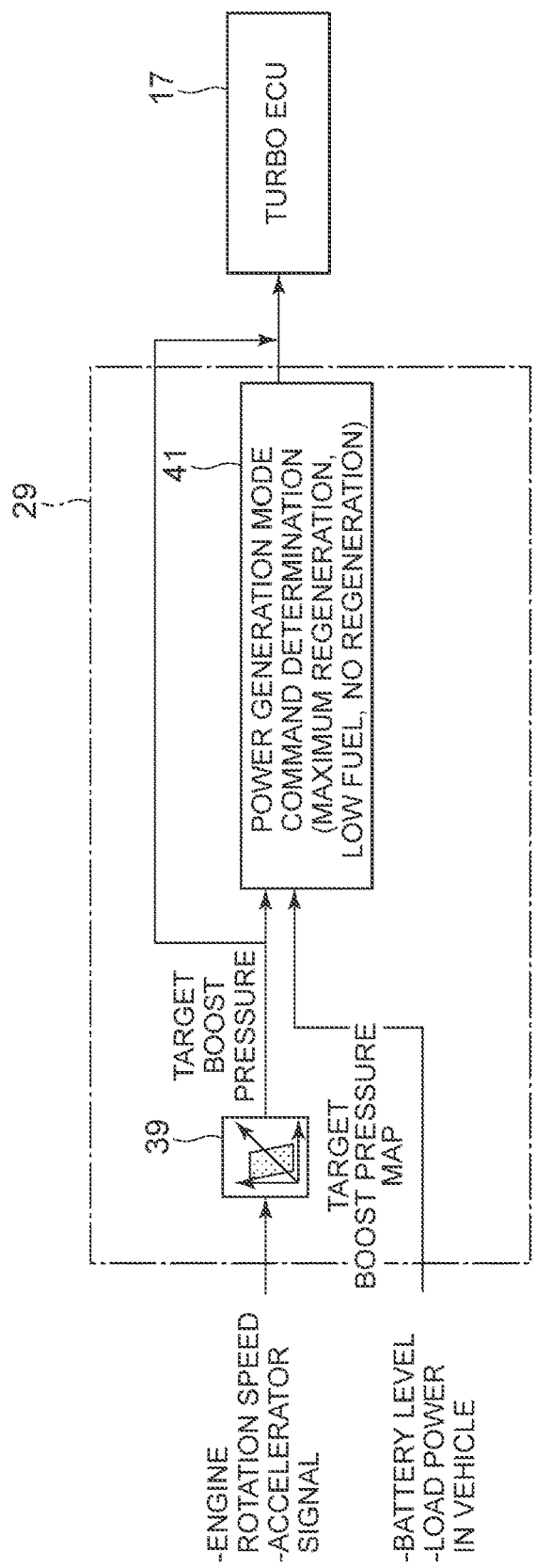
FIG. 3 is a detailed explanatory diagram of a part of the engine ECU illustrated in FIG. 2.

With reference to FIG. 3, the determination of the power generation mode of the turbine generator 7 by the engine ECU 29 will be described.

As illustrated in FIG. 3, a target boost pressure suitable for an operation state is calculated using a target boost-pressure map 39 set in advance, on the basis of an engine rotation speed and acceleration (engine load). The calculation result is outputted to the turbo ECU 17 directly as a target value, and also inputted to a power-generation-mode determination unit 41.

The power-generation-mode determination unit 41 determines three modes: a maximum-regeneration mod; a low fuel-consumption mode; and a no-regeneration mode.

The "maximum-regeneration mode" is selected, for instance, if remaining charge of the battery 13 is low and quick charging is required, if an electric load is high in a vehicle and alternator generation power or regeneration power of a wheel driving motor (in a case of an electric vehicle) is insufficient, or if generation by the turbine generator (turbo compound) 7 is more efficient than generation by alternator power generation or power generation by regeneration power of the wheel driving motor, for instance.

Further, "no-regeneration mode" is selected if charging of the battery 13 is full or close to full and cannot be charged more by regeneration, if an electric load inside a vehicle is sufficiently covered by alternator generation power or regeneration power of a wheel driving motor and thus additional power is not required, if increasing power generation by adding power with alternator generation power or regeneration power of a wheel driving motor (in a case of an electric vehicle) is more advantageous in terms of efficiency, or if the turbine generator (turbine compound) 7 is malfunctioning.

Further, "low fuel-consumption mode" is selected when conditions for selecting the above two modes are not met, and a power output of the turbine generator 7 is optimized taking account of an increase in engine pumping loss accompanying an increase in a back pressure of the engine by the turbine generator 7.

Next, with reference to FIGS. 1, 4, and 5, the turbo ECU 17 will be described.

As illustrated in FIG. 1, various signals from the exhaust turbocharger 5 are inputted into a sensor-signal input part 43 of the turbo ECU 17, the signals including, for instance, a discharge pressure signal of the compressor 5b obtained by the pressure sensor 33, a back-pressure signal obtained by the back-pressure sensor 37, an exhaust-gas temperature signal obtained by the exhaust-temperature sensor 38, and a rotation-speed signal of the exhaust turbine 5a obtained by the rotation-speed sensor 35, as described above.

The turbo ECU 17 includes the sensor-signal input part 43 and a control computation part 45 provided separately from the engine ECU 29. That is, it is possible to input detection signals accurately (timely) representing a rotation speed of the exhaust turbine 5a and an output pressure of the compressor 5b independently, instead of signals transmitted from the ECU 29. Thus, it is possible to determine a surge margin with respect to occurrence of surging of the compressor 5b and a rotation-speed margin with respect to over rotation. That is, it is possible to receive signals without waiting for a communication cycle, unlike a case in which signals are obtained through transmission with the engine ECU 29. As a result, it is possible to prevent entry to over rotation or surging more accurately.

Further, the turbo ECU 17 includes a margin ensuring control unit 47 which performs a control to ensure a margin, a boost-pressure control unit 49 which controls a boost pressure to a target boost pressure commanded by the engine ECU 29, a power-generation-mode setting unit 31 which sets a power generation mode on the basis of a command of a power generation mode from the engine ECU 29, a power-generation-amount control unit 51 which controls the power generation amount of the turbine generator 7 in accordance with the setting mode of the power-generation-mode setting unit 31, and a back-pressure control unit 53 which controls the back pressure of the engine 3.

Figure 4:
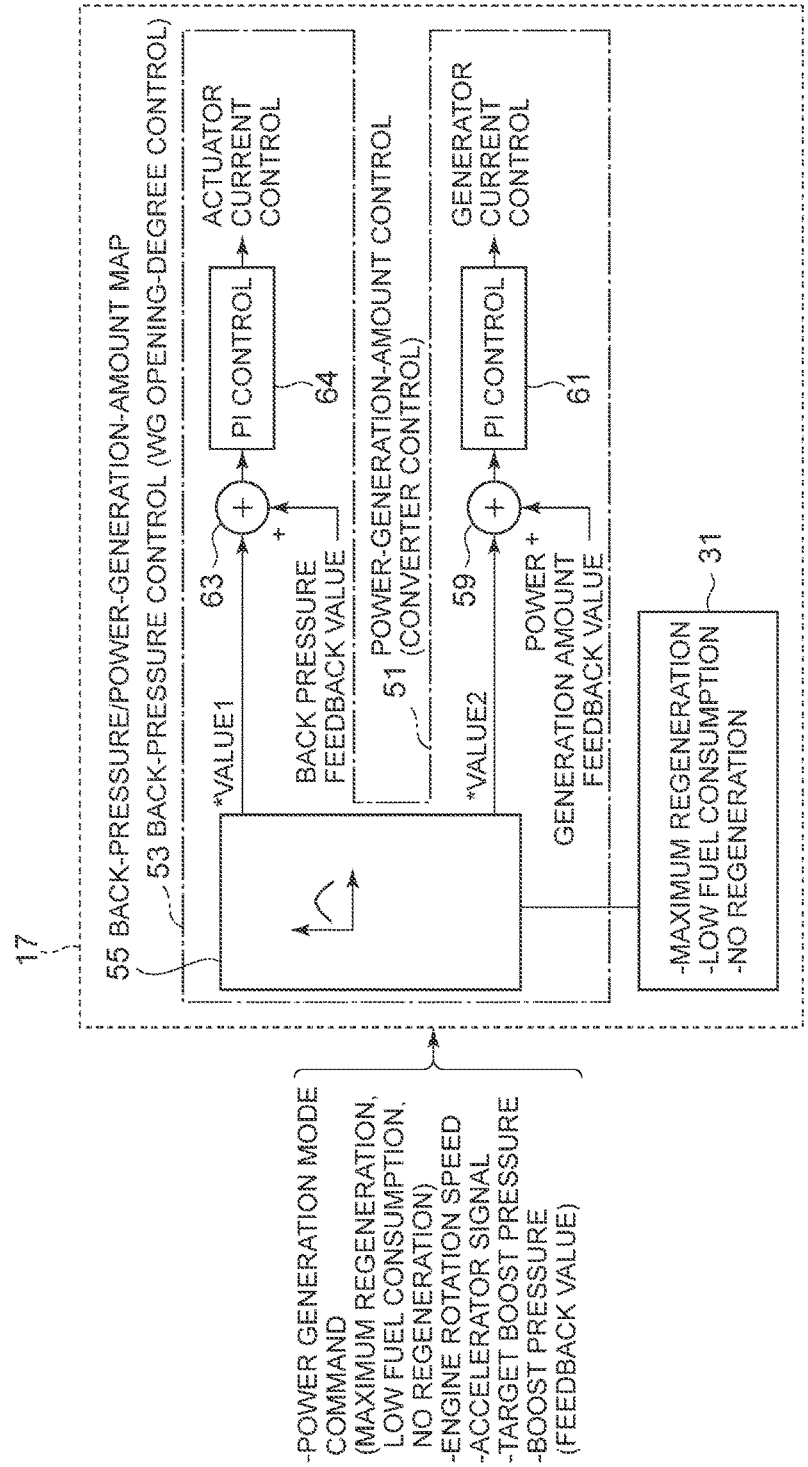
FIG. 4 is a detailed explanatory diagram of a part of the turbo ECU illustrated in FIG. 3.

FIG. 4 illustrates the power-generation-mode setting unit 31, the power-generation-amount controlling unit 51, and the back-pressure control unit 53. In FIG. 4, signals are inputted from the engine ECU 29 to the turbo ECU 17 as described above, the signals representing, for instance, a command related to a power generation mode, an engine back pressure, an engine rotation speed, an accelerator position, a target boost pressure, a boost pressure (feedback value), as described above.

If the power generation mode is in the maximum regeneration mode, the boost-pressure control unit 49 controls the first waste gate valve 23 and the second waste gate valve 27 to achieve a target boost pressure, controlling the first waste gate valve 23 to open and close but maintaining the second waste gate valve 27 to be fully closed, so that the exhaust gas does not flow through the second bypass channel but flows through entirely the power generation turbine 7a of the turbine generator 7, thereby achieving the maximum output state of the power generation amount of the generator 9.

In the no-regeneration mode, the first waste gate valve 23 and the second waste gate valve 27 are controlled by a boost-pressure control to achieve a target boost pressure, the first waste gate valve 23 being controlled to open and close and the second waste gate valve 27 being maintained to be fully open, so that the exhaust gas flows through the second bypass channel 25 and power generation of the turbine generator 7 is stopped.

In the low fuel-consumption mode, used is a back-pressure/power-generation-amount map 55 in which a relationship between the back pressure of the engine 3 and the power generation amount of the turbine generator 7 is set in advance, the power generation amount being such that low fuel-consumption can be kept with respect to the back pressure.

In the back-pressure/power-generation-amount map 55, a relationship between the power generation amount and the back pressure is set so that a relationship between an increase in pumping loss due to a back-pressure rise caused in response to rotation of the power generation turbine 7a of the turbine generator 7 and a recovery amount of exhaust energy obtained by an increase in the power generation amount achieved by the turbine generator 7 is such that the engine continues low fuel-consumption operation, i.e., so that the recovery amount of exhaust energy recovered by the turbine generator is greater than an increase in fuel consumption due to an increase in pumping loss.

Figure 5:
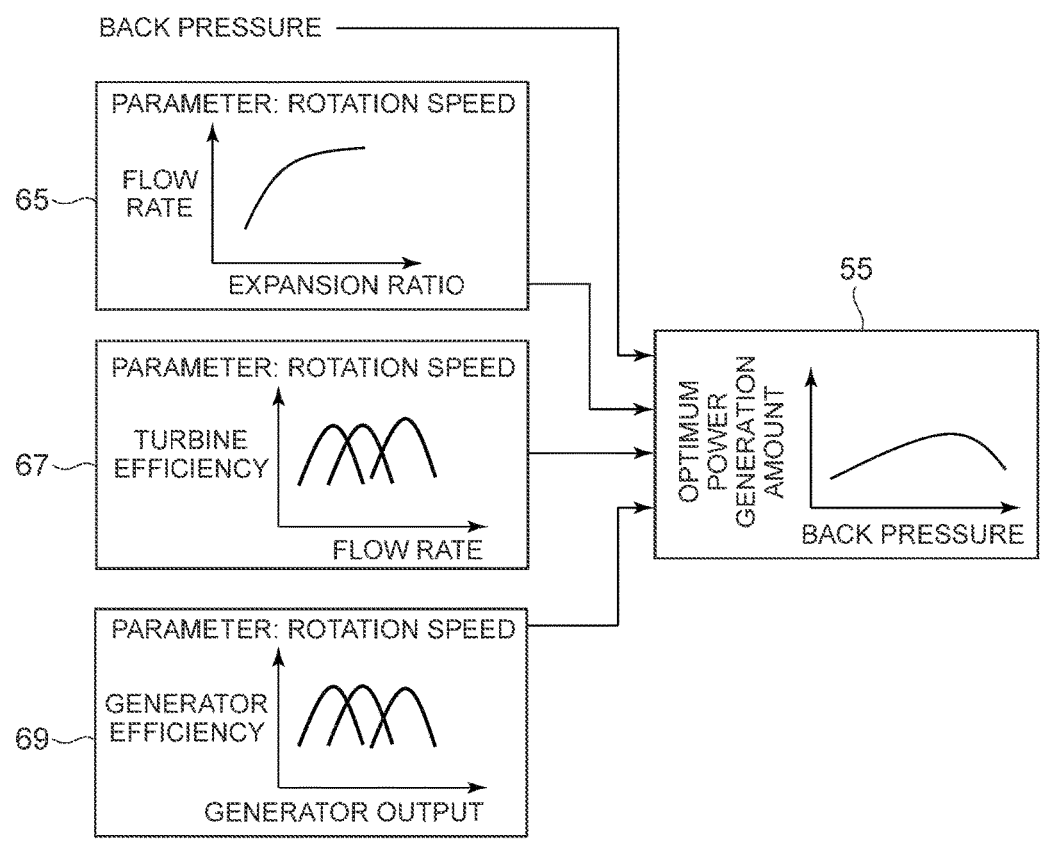
FIG. 5 is a detailed explanatory diagram of a back-pressure generation amount illustrated in FIG. 4.

The back-pressure/power-generation-amount map 55 stores setting values calculated from tests or simulations in a form of a two-dimensional map with x-axis representing the back pressure and y-axis representing the optimum power generation amount, as illustrated in FIG. 5, for instance.

A boost pressure and operation under the low fuel-consumption mode are controlled as follows. First, the first waste gate valve 23 and the second waste gate valve 27 are opened and closed by the boost-pressure control unit 49 so as to achieve a target boost pressure. Next, a back pressure in a state where the target boost pressure is achieved, which is the pressure of exhaust gas flowing into the exhaust turbine 5a of the exhaust turbocharger 5, is detected by the back-pressure sensor 37. Next, the back-pressure/power-generation-amount map 55 is applied to the detected back pressure to obtain a power-generation-amount command value for the turbine generator 7.

Then, an adder 59 adds a power-generation-amount feedback value to the obtained power-generation-amount command value to calculate a generator current control value through a PI controller 61 to control the converter 11.

Further, a back pressure in a state in which the target boost pressure is achieved, i.e., the back pressure at the time when the target boost pressure detected by the back-pressure sensor 57 is achieved, is outputted as a back-pressure command value, and the opening degrees of the waste gate valves 23, 27 are controlled to maintain this back pressure.

An adder 63 adds a back-pressure feedback value to the back-pressure command value, and calculates actuator current control values of the waste gate valves 23, 27 through the PI controller 64 to control the opening degrees.

One of the waste gate valve 23 or the second waste gate valve 27 may be controlled on the basis of the opening command value, or both may be controlled.

Further, setting the optimum power generation amount in the back-pressure/power-generation-amount map 55 taking account of turbine efficiency of the power generation turbine 7a and also generator efficiency of the generator 9 makes it possible to control the power generation amount of the generator 9 more accurately.

Specifically, with the back-pressure/power-generation-amount map 55 created to reflect characteristics of the power generation turbine 7a, the turbine efficiency, and the power generation efficiency using a flow-rate characteristics map 65 of the power generation turbine 7a, a turbine efficiency map 67 of the power generation turbine 7a, and a generation efficiency map 69 of the generator 9 makes it possible to control the power generation amount more accurately, as illustrated in FIG. 5.

Besides creating the back-pressure/power-generation-amount map 55 in advance that enables low fuel-consumption operation as described above, low fuel-consumption operation of the engine can be executed by optimization based on a model predictive control theory.

The model predictive control is a control approach of solving the following evaluation functional expression (2) for each time t, where the control target is given by the following state equation (1) of a common non-linear system, and using only the values at time t as actual control inputs.

$$\dot{x}(t) = f(x(t), u(t), t) \quad (1)$$

$$J = \varphi(x(t+T), t+T) + \int_{t}^{t+T} L(x(\tau), u(\tau), \tau)d\tau \quad (2)$$

In the above equations, x(t) is a state vector and u(t) is a control-input vector.

Specifically, as stage cost terms of the evaluation functional expression (2), "a difference between power generation by a turbo compound and a pumping-loss increase" and "a difference between a target boost pressure and an actual pressure" are set, for instance. The contribution ratio of each term can be given as a weight of adding. Further, with a surge margin and a rotation-speed margin set as penalty functions within the stage cost terms, it is possible to provide restrain conditions that surging and over rotation do not substantially occur.

According to the above described first embodiment, by using the back-pressure/power-generation-amount map 55 defining a relationship between a back pressure and a power generation amount capable of maintaining preset low fuel-consumption operation or using optimization based on the model predictive control theory, a relationship between the power generation amount of the turbine generator 7 and the engine back pressure is set so that a relationship between an increase in pumping loss due to a back-pressure rise caused in response to rotation of the power generation turbine 7a of the turbine generator 7 and a recovery amount of exhaust energy obtained by an increase in the power generation amount achieved by the turbine generator 7 is such that a recovery amount of exhaust energy recovered by the turbine generator is greater than an increase in the fuel consumption due to an increase in the pumping loss.

As a result, it is possible to operate an engine equipped with a turbo compound at a low fuel-consumption rate.

Second Embodiment

Figure 6:
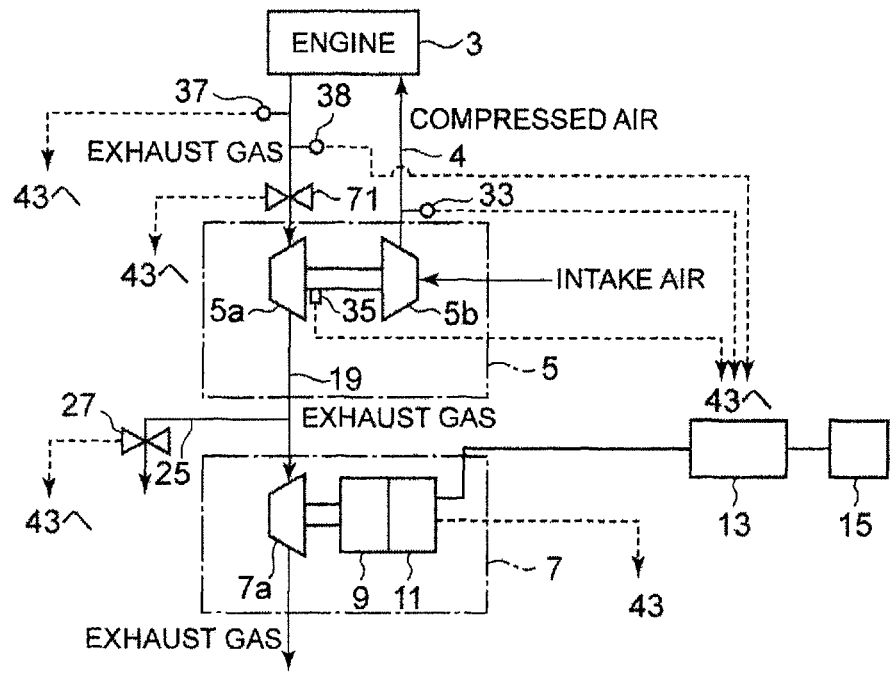
FIG. 6 is an overall configuration diagram a turbo-compound system of the second embodiment.

Next, the second embodiment will be described with reference to FIG. 6.

In the second embodiment, a variable nozzle mechanism 71 is provided instead of the first waste gate valve 23 of the first embodiment, the variable nozzle mechanism 71 being configured to restrict a flow of exhaust gas flowing to the turbine blades of the exhaust turbine 5a.

Specifically, a variable geometry (VG) turbocharger is used. The engine ECU 29 and the turbo ECU 17 are not depicted in FIG. 6.

The variable nozzle mechanism 71 is a mechanism disposed inside a casing of the exhaust turbocharger 5. Thus, while the first bypass channel 21 needs to be additionally provided for a structure including the first waste gate valve 23, such pipe arrangement is not required in the present embodiment, and thus the structure of the turbo-compound system is simplified, thereby achieving a unique functional effect of reducing the size of the turbo-compound system. For the rest, the present embodiment has the same functional effects as the first embodiment.

It will be understood that both of the first waste gate valve 23 of the first embodiment and the variable nozzle mechanism 71 may be provided, instead of only one of them being exclusively provided.

Third Embodiment

Next, the third embodiment will be described with reference to FIG. 7.

In the third embodiment, an electric compressor 81 for pressurizing intake air is further disposed in the intake channel 4 in addition to the configuration of the second embodiment so as to pressurize intake air in two stages. The same features as those in the second embodiment are indicated by the same reference numerals and not described in detail.

Figure 7:
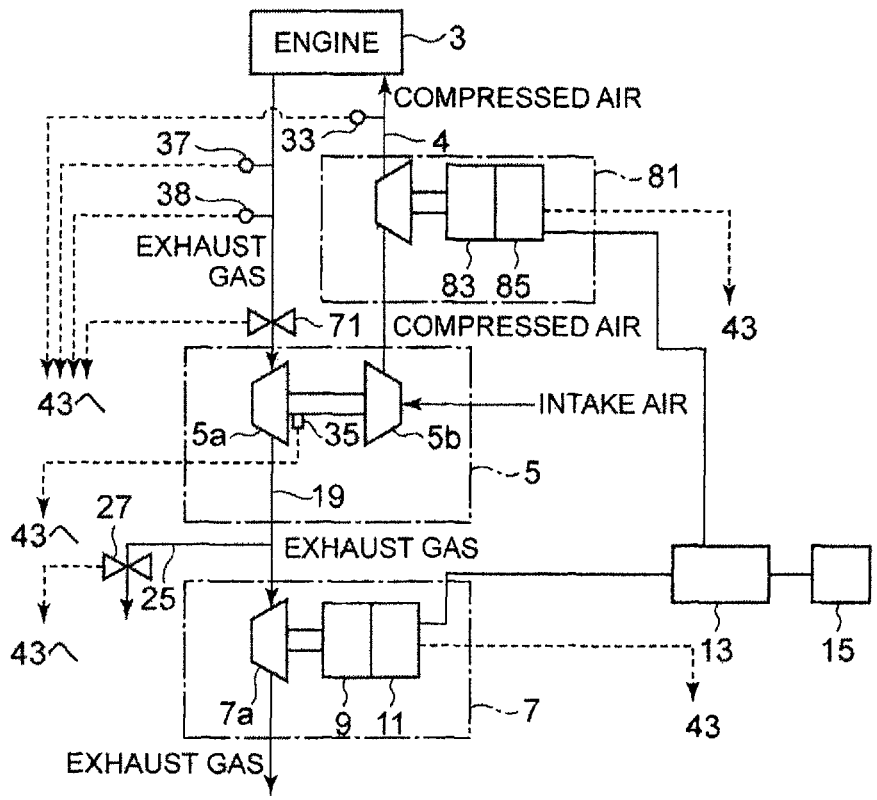
FIG. 7 is an overall configuration diagram a turbo-compound system of the third embodiment.

As illustrated in FIG. 7, the electric compressor 81 is disposed on the downstream side of the exhaust turbocharger 5 with respect to the flow of the intake air to further pressurize the intake air. The electric compressor 81 includes a motor 83 and an inverter 85, and control signals from the turbo ECU 17 are inputted into the inverter 85 to control a boost pressure.

The electric compressor 81 consumes electric power and acts as an electric load, and the turbine generator 7 increases the back pressure due to the power generation turbine 7a instead of generating electric power, thereby increasing pumping loss and causing negative effects on the engine.

On the other hand, the electric compressor 81 increases a boost pressure to the engine 3 instead of consuming electric power, thereby causing positive effects on the engine 3 and contributing to low fuel-consumption operation.

Thus, a power consumption amount of the electric compressor 81 and an increase in the engine output are taken in account in addition to the control of the first embodiment.

Specifically, "pumping loss" in the first embodiment is now read as "pumping loss and a power consumption of the electric compressor 81", and "a power generation amount" in the first embodiment is now read as "a power generation amount and an increase in the engine output due to the electric compressor 81".

Specifically, a back-pressure/power-generation amount map used in the present embodiment is similar to the back-pressure/power-generation amount map 55 in the first embodiment but is different in that x-axis represents "back pressure+power consumption of the electric compressor 81" instead of the back pressure only, and y-axis represents "a power generation amount of the turbine generator 7+an increase in the engine output due to the electric compressor 81" instead of the optimum power operation amount. Using the back-pressure/power-generation-amount map, control is performed on the basis of a relationship between the back pressure and the power generation amount for executing low fuel-consumption operation, similarly to the first embodiment.

For instance, the electric compressor 81 or the variable nozzle mechanism 71 is started so as to achieve a target boost pressure. Then, the power generation amount of the turbine generator 7 at a back pressure in a state in which the target boost pressure has been achieved is calculated on the basis of the newly set back-pressure/power-generation-amount map 55', thereby controlling the converter 11 of the generator 9 to achieve the power generation amount, as well as controlling one of or both of the variable nozzle mechanism 71 and the second waste gate valve 27 so as to maintain a back pressure in accordance with a back-pressure command value based on a back pressure at the time of reaching the target boost pressure.

According to the third embodiment, with the electric compressor 81 additionally provided, it is possible to control an intake pressure to the engine to a target air pressure more quickly than in the first and second embodiments. Further, it is possible to control the pressure to reach the target boost pressure without increasing the back pressure as compared to the first and second embodiments having only the exhaust turbocharger 5, and thus the present embodiment has an effect to reduce pumping loss.

While the electric compressor 81 is disposed on the downstream side of the exhaust turbocharger 5 with respect to the flow of intake air in the above described example, the electric compressor 81 may be disposed on the upstream side.

Fourth Embodiment

Next, the fourth embodiment will be described with reference to FIG. 8.

In the fourth embodiment, only the electric compressor 81 described in the third embodiment is disposed instead of the exhaust turbocharger 5 in the first embodiment.

Figure 8:
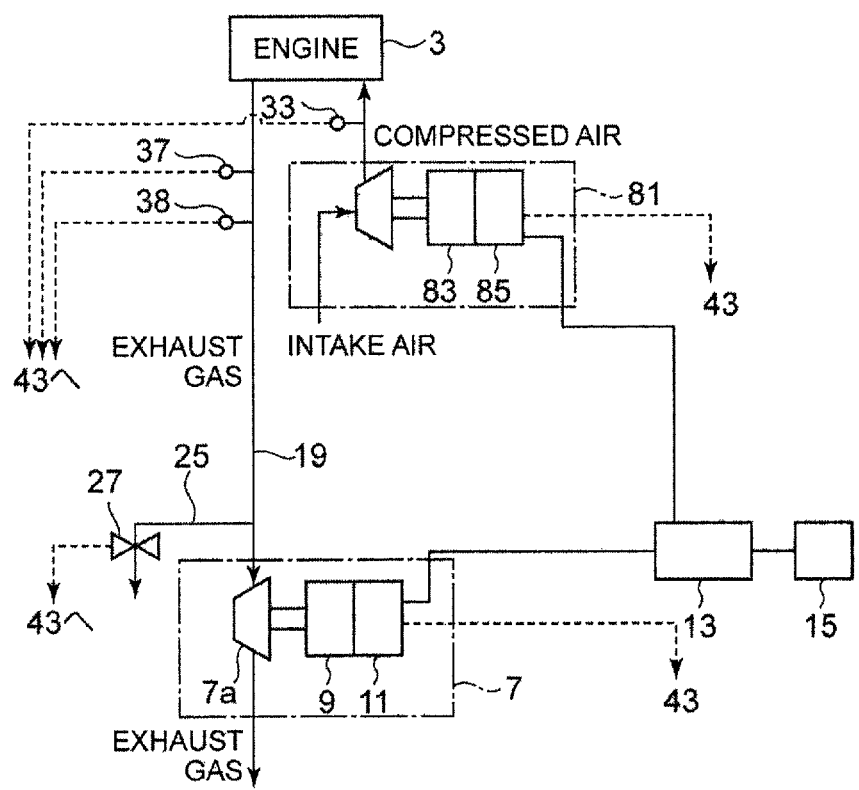
FIG. 8 is an overall configuration diagram a turbo-compound system of the fourth embodiment.
Figure 9:
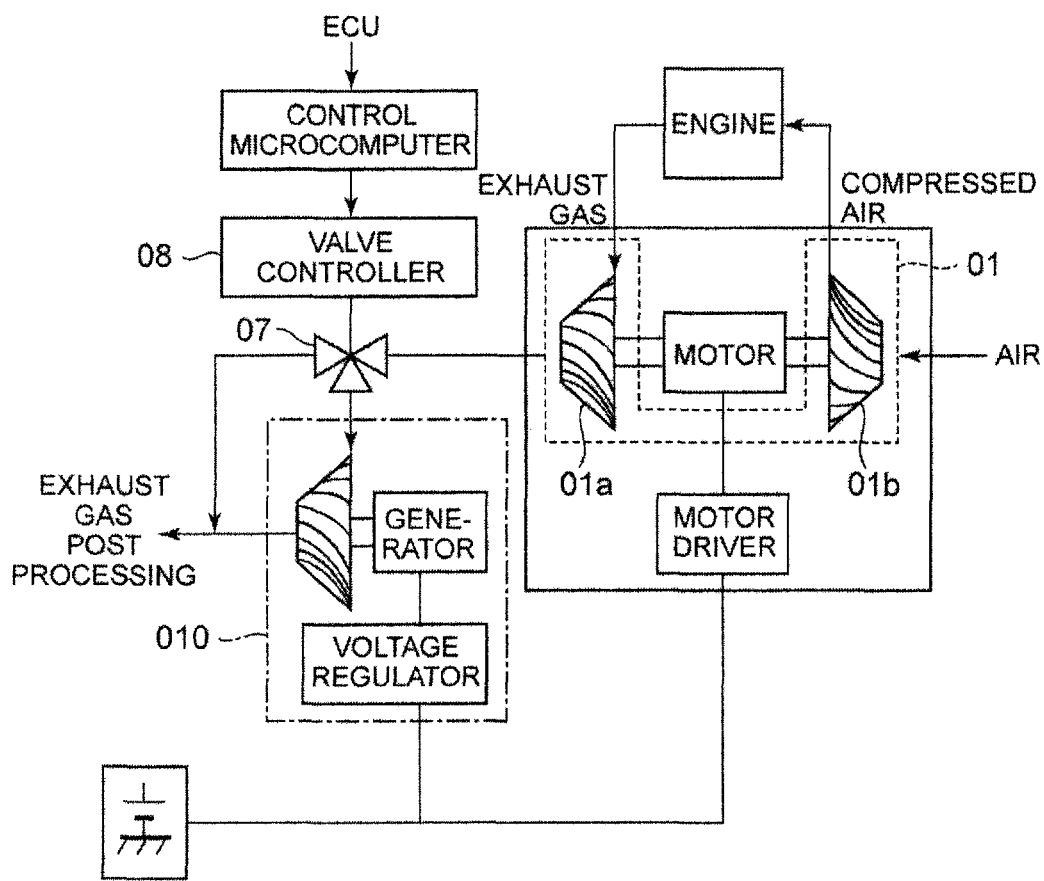
FIG. 9 is an explanatory diagram of a related art.

As illustrated in FIG. 8, the electric compressor 81 is disposed in the intake channel 4, the turbine generator 7 of the turbo compound is disposed in the exhaust channel 19, and the second waste gate valve 27 is disposed in the second bypass channel 25, through which the exhaust gas bypasses the power generation turbine 7a.

In the turbo-compound system with the electric compressor 81 and the turbine generator 7 respectively disposed in the intake channel 4 and the exhaust channel 19, the back-pressure control unit for controlling the back pressure of the engine comprises the waste gate valve 27 for exhaust gas to bypass the power generation turbine 7a of the turbine generator 7, and the power-generation-amount control unit for controlling the power generation amount comprises the converter 11 connected to the generator 9 of the turbine generator 7. Thus, it is possible to control the back pressure and the power generation amount with a simplified structure.

Further, the control method is similar to that in the first embodiment and the back pressure is controlled only by the second waste gate valve 27, and thus is simplified.

INDUSTRIAL APPLICABILITY

According to the present invention, it is possible to enable low fuel-consumption operation of an engine by controlling the back pressure and the output of the generator taking account of the trade-off (paradoxical) relationship between improvement of fuel efficiency by recovery of exhaust energy by the turbo compound and deterioration of fuel efficiency due to an increase in pumping loss of the engine accompanying an increase in the back pressure. Thus, the present invention can be effectively applied to a control system for a turbo-compound system.

DESCRIPTION OF REFERENCE NUMERAL

1 Turbo-compound system
3 Engine
5 Exhaust turbocharger (turbocharger)
7 Turbine generator (electric turbo compound)
9 Generator
11 Converter (power-generation-amount control unit)
13 Battery
15 Auxiliary machine
17 Turbo ECU (turbo controller)
23 First waste gate valve (back-pressure control unit)
27 Second waste gate valve
29 Engine ECU (engine controller)
31 Power generation mode setting unit
33 Pressure sensor
35 Rotation-speed sensor
37 Back-pressure sensor
38 Exhaust-temperature sensor
39 Target boost-pressure map
41 Power-generation-mode determination unit
43 Sensor-signal input part 45 Control computation part
47 Margin ensuring control unit
49 Boost-pressure control unit
51 Power-generation-amount control unit
53 Back-pressure control unit
55 Back-pressure/power-generation-amount map
65 Flow-rate characteristics map of power generation turbine
67 Turbine efficiency map of power generation turbine
69 Generation efficiency map of generator
71 Variable nozzle mechanism
81 Electric compressor
83 Motor
85 Inverter

The invention claimed is:

1. A control system for a turbo-compound system, comprising:
   an exhaust turbocharger including an exhaust turbine driven by exhaust gas from an engine and a compressor compressing intake air and supplying the compressed air to the engine;
   a turbine generator including a power generation turbine driven by the exhaust gas from the engine and a generator connected to the power generation turbine;
   a storage unit storing electric power generated by the turbine generator;
   an engine controller configured to control operation of the engine;
   wherein the engine controller is configured to determine a target boost pressure based on an engine rotation speed and engine load of the engine and to include a power-generation-mode determination unit which determines a command power generation mode, based on the target boost pressure and remaining charge of the storage unit, to one of:
   a maximum regeneration mode to cause the turbine generator to perform regeneration operation at a maximum capacity without limiting power generation of the turbine generator;
   a no-regeneration mode to stop power generation of the turbine generator; and
   a low fuel-consumption mode;
   a turbo controller configured to receive the target boost pressure and the command power generation mode from the engine controller at a predetermined communication cycle;
   wherein the turbo controller includes a control computation part and a sensor-signal input part;
   wherein the control computation part includes:
   a boost-pressure control unit which controls a boost pressure of the exhaust turbocharger based on the command of the target boost pressure from the engine controller;
   a power-generation-mode setting unit which sets a power generation mode based on the command of the power generation mode from the engine controller;
   a power-generation-amount control unit which controls a power generation amount of the turbine generator in accordance with the setting mode of the power-generation mode setting unit; and
   a back-pressure control unit configured to control at least one of a bypass control valve bypassing the exhaust gas being introduced into the exhaust turbine and a variable nozzle mechanism restricting the exhaust gas being introduced into the exhaust turbine; and
   wherein the sensor-signal input part is configured to read in a sensor signal from a back-pressure sensor for detecting a pressure of the exhaust gas flowing into the exhaust turbine; and
   wherein the turbo controller is configured to control the power generation-amount control unit and the back-pressure control unit to achieve at least a recovery amount of exhaust energy recovered by the turbine generator is greater than an increase in a fuel consumption due to an increase in pumping loss due to a back-pressure rise caused in response to rotation of the turbine generator, during the low-fuel-consumption mode.

2. The control system for a turbo-compound system according to claim 1,
   wherein the turbo controller has a back-pressure/power-generation-amount map in which a relationship between the back pressure and the power generation amount of the turbine generator is set in advance, the power generation amount being such that low fuel-consumption is sustainable with respect to the back pressure, and is configured to control the power-generation-amount control unit and the back-pressure control unit based on the back-pressure/power-generation-amount map.

3. The control system for a turbo-compound system according to claim 1,
   wherein the back-pressure control unit is configured to control the bypass control valve, and
   wherein the power-generation-amount control unit is configured to control a converter connected to the turbine generator.

4. The control system for a turbo-compound system according to claim 3, further comprising:
   an electric compressor disposed on a downstream side, with respect to a flow of air supply, of a compressor of the exhaust turbocharger.

5. The control system for a turbo-compound system according to claim 1,
   wherein the back-pressure control unit is configured to control a variable nozzle mechanism to restrict the exhaust gas being supplied into turbine blades of the exhaust turbine, and
   wherein the power-generation-amount control unit is configured to control a converter connected to the turbine generator.

6. The control system for a turbo-compound system according to claim 1,
   wherein the turbo turbo-compound system further comprises an electric compressor,
   wherein the back-pressure control unit further comprises an additional bypass control valve for bypassing the exhaust gas being supplied to a power generation turbine of the turbine generator rotated by the exhaust gas from the engine, and
   wherein the power-generation-amount control unit further comprises a converter connected to the turbine generator.

7. The control system for a turbo-compound system according to claim 1,
   wherein the turbo controller is configured to, during the low fuel-consumption mode, control the boost pressure of the exhaust turbocharger to achieve the target boost pressure by the boost pressure control unit and to control the power generation-amount control unit and the back-pressure control unit based on the pressure of exhaust gas flowing into the exhaust turbine when the target boost pressure is achieved.

\* \* \* \* \*